F. O. STENZEL.
BELT FASTENER.
APPLICATION FILED MAR. 13, 1908.

926,616.  Patented June 29, 1909.

Witnesses
Joe. P. Wahler.
P. M. Smith.

Inventor,
Frank O. Stenzel.
By Victor J. Evans.
Attorney.

UNITED STATES PATENT OFFICE.

FRANK O. STENZEL, OF PATTERSON, TEXAS.

BELT-FASTENER.

No. 926,616.　　　Specification of Letters Patent.　　　Patented June 29, 1909.

Application filed March 13, 1908. Serial No. 420,845.

*To all whom it may concern:*

Be it known that I, FRANK O. STENZEL, a citizen of the United States, residing at Patterson, in the county of Waller and State of Texas, have invented new and useful Improvements in Belt-Fasteners, of which the following is a specification.

This invention relates to belt fasteners, the object of the invention being to provide a simple, practical and efficient fastener for the contiguous ends of a driving belt, the fastening device being of such a nature as to permit the belt to pass around pulleys of comparatively small size without injurying the life and durability of the fastening device.

With the above and other objects in view, the nature of which will more fully appear as the description proceeds, the invention consists in the novel construction, combination and arrangement of parts as herein fully described, illustrated and claimed.

Figure 1:
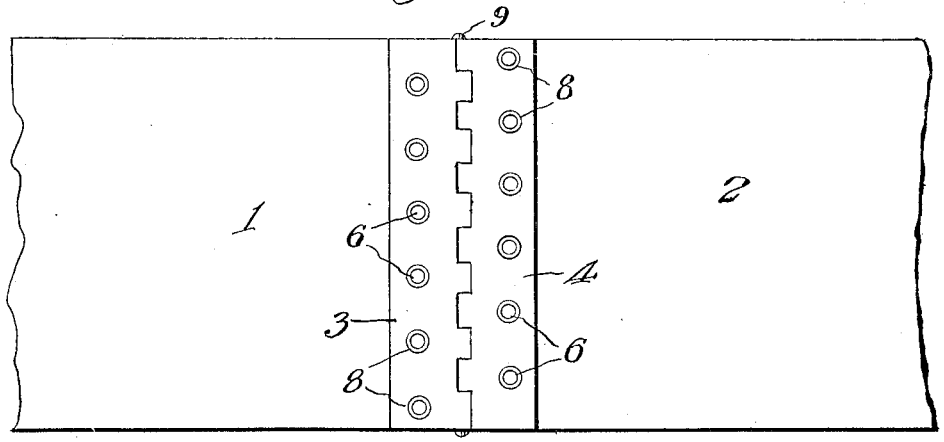
Figure 2:
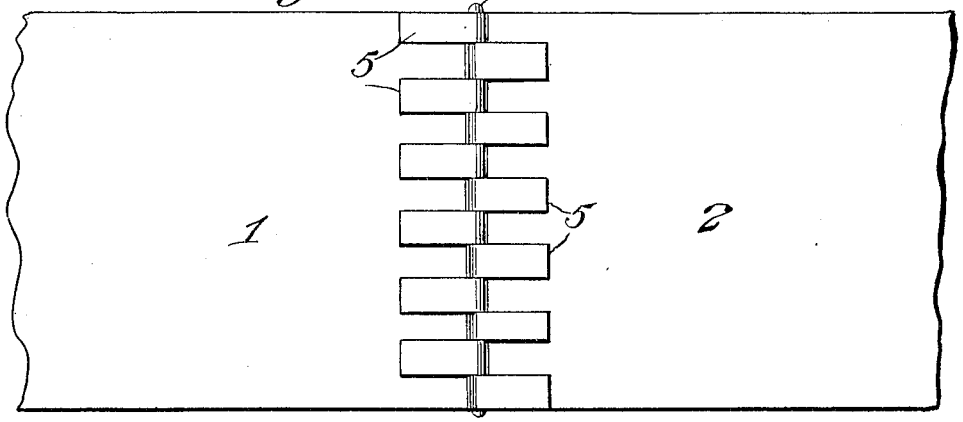
Figure 3:
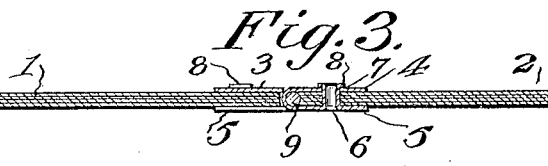

In the accompanying drawing:—Figure 1 is a plan view of the fastener applied to a belt. Fig. 2 is also a plan view thereof looking from the opposite side. Fig. 3 is a longitudinal section through Figs. 1 and 2.

Referring to the drawing, 1 and 2 designate the contiguous ends of a belt, the same being shown as connected by the improved fastener contemplated in this invention.

The fastener embodies three pieces two of said pieces being in the form of knuckle strips 3 and 4 each of which is provided along one side with a plurality of tongues 5 which are bent over to form knuckles as clearly shown in Figs. 1 and 2, the bent-over tongues lying parallel with the opposite portions of the strips, as shown in Fig. 3.

Connected to the tongues 5 are fasteners in the form of hollow rivets 6, corresponding in number with the number of tongues 5 while the strips 3 and 4 are provided with holes 7 in alinement with the rivets, the said holes being adapted to receive the rivets which are subsequently headed or clenched upon the outer surfaces of said strips, as shown at 8.

The knuckle blades are brought together so as to cause the knuckles to overlap as shown in Figs. 1 and 2 and a coupling pin 9 is then inserted through all of the angles, the length of said pin being equal to or slightly greater than the width of the belt ends 1 and 2. This construction forms a hinge joint between the adjacent ends of the belts enabling the belt to travel around a pulley of comparatively small circumference and by reason of the number of fastening rivets and the alternate arrangement of the oppositely projecting tongues 5, an unusually strong and reliable fastening device is provided which with the exception of the coupling pin is formed out of sheet metal. This metal may be made of any gage suitable to the size of belt in connection with which the fastening device is used in accordance with the strength required.

The belt can be used at various places by simply pulling out the pin; then the belt can be entirely taken off of the pulleys and shafting.

Having thus described the invention, what is claimed as new, is:—

A belt fastener comprising a pair of complemental sheet metal knuckle strips provided with alternately arranged parallel tongues the free extremities of which are bent back in parallel relation to the bodies of the straps to form knuckles, the said knuckles interfitting and overlapping and the combined width of said tongues being equal to the length of the knuckle strips, tubular rivets secured at one end to the free end of said tongues and adapted for insertion through corresponding holes in the bodies of the knuckle strips against which they may be headed, and a hinge pin passing through all of the knuckles and serving to couple the knuckle strips together, substantially as described.

In testimony whereof I affix my signature in presence of two witnesses.

FRANK O. STENZEL.

Witnesses:
　C. R. DE WITT,
　A. J. JORDAN.